United States Patent [19]

Obsomer

[11] Patent Number: 4,499,045
[45] Date of Patent: Feb. 12, 1985

[54] PROCESS FOR THE PRODUCTION OF TUBES OF A MOLECULARLY ORIENTED PLASTIC

[75] Inventor: Marc Obsomer, Brussels, Belgium

[73] Assignee: Solvay & Cie (Societe Anonyme), Brussels, Belgium

[21] Appl. No.: 405,708

[22] Filed: Aug. 5, 1982

[30] Foreign Application Priority Data

Aug. 6, 1981 [FR] France ............................. 81 15427

[51] Int. Cl.³ .............................................. B29C 17/07
[52] U.S. Cl. ..................................... 264/532; 264/531; 264/535; 264/570; 264/573; 425/526; 425/529; 425/387.1
[58] Field of Search ............... 264/523, 530, 531, 532, 264/535, 570, 573; 425/526, 529, 535, 387.1

[56] References Cited

U.S. PATENT DOCUMENTS

| 1,871,491 | 8/1932 | Barrett . | |
|---|---|---|---|
| 3,160,130 | 12/1964 | Pesak | 113/44 |
| 3,288,898 | 11/1966 | West | 264/523 X |
| 3,849,530 | 11/1974 | Wyeth et al. | 264/535 X |
| 3,936,260 | 2/1976 | Farrell | 425/242 |
| 4,098,857 | 7/1978 | Farrell | 264/89 |
| 4,340,344 | 7/1982 | Aston et al. | 425/387.1 X |
| 4,363,619 | 12/1982 | Farrell | 425/526 X |
| 4,447,199 | 5/1984 | Reed et al. | 264/532 X |

FOREIGN PATENT DOCUMENTS

| 1450044 | 7/1966 | France . | |
| 2184857 | 12/1973 | France . | |
| 2289320 | 10/1975 | France . | |
| 2365423 | 9/1977 | France . | |
| 56-162610 | 12/1981 | Japan | 264/531 |
| 1432539 | 4/1976 | United Kingdom . | |

Primary Examiner—Jan Silbaugh
Attorney, Agent, or Firm—Spencer & Frank

[57] ABSTRACT

A portion of a plastic tube (16) heated to a temperature at which stretching induces a molecular orientation, is clamped in a sleeve (14), a fluid under pressure is introduced into the portion of tube and the sleeve is moved along the portion of tube to cause its progressive radial expansion until it makes contact with a mould (1).

4 Claims, 3 Drawing Figures

PROCESS FOR THE PRODUCTION OF TUBES OF A MOLECULARLY ORIENTED PLASTIC

The present invention relates to a process and an apparatus for the production of tubes of a plastic which is molecularly oriented by radial expansion, by means of a fluid, of a portion of tube of unoriented plastic, which is at a temperature at which stretching induces a molecular orientation.

It is known that the mechanical properties of plastic articles, and especially of tubes, can be improved by subjecting the articles to a monoaxial or bi-axial stretching treatment as well-defined temperatures which depend on the nature of the plastic of which the article consists.

Thus, British Patent GB-A-1,432,539 (YORKSHIRE IMPERIAL PLASTICS Ltd.) has proposed a process for the production of tubes of molecularly oriented plastic, according to which a portion of tube is placed in a mould whose internal dimensions correspond to the external dimensions of the desired oriented tube, this portion of tube is heated to the temperature for molecular orientation by stretching, an internal pressure is exerted to dilate the section of tube radially and apply its wall against the mould, and thereafter the oriented tube thus produced is cooled under pressure, in the mould.

This process permits the production of radially oriented tubes which have valuable mechanical properties but it proves difficult to apply to tubes of great length. In the latter case, a tube which is uniformly oriented over its entire length is not obtained, because the hot starting tube is not centred during its dilation. Moreover, during the application of pressure, the expansion and hence the molecular orientation often start in several places at the same time. This phenomenon, which is difficult to control, causes substantial variations in thickness in the longitudinal section and even causes creases where the two expansion fronts meet. Finally, this process only makes it possible to obtain tubes with low degrees of longitudinal orientation because the length of the mould is substantially the same as that of the initial portion of tube.

The present invention proposes to provide a process of the same type which no longer suffers from the disadvantages of the known process and which permits the production of oriented tubes of great length, which are free from defects and have perfectly constant wall thicknesses.

The invention accordingly relates to a process for the production of tubes of molecularly oriented plastic, according to which a portion of tube is placed in a mould, the raidal expansion of the portion of tube, heated to the temperature at which stretching induces a molecular orientation of the plastic, is effected by means of a fluid which is introduced under pressure into the portion of tube after having closed the latter at its two ends, and the resulting tube is cooled and removed from the mould; according to the invention, the portion of tube is clamped in sleeve and the sleeve is caused to undergo a relative movement along the portion of tube whilst fluid is introduced into the latter, so as to cause the radial expansion of the portion of tube downstream of the sleeve.

In the process according to the invention, the start of the radial expansion of the portion of tube which is to be oriented always takes place at one end, and the expansion bubble formed progressively spreads along the portion of tube, this progression being controlled by the relative movement of the sleeve along the portion of tube. Hence, possible defects in the initial portion of tube have no major effect on the process of orientation, because the orientation takes place progressively along the portion of tube. Equally, an error in thermal conditioning also has no influence on the orientation, because the latter is always initiated at the same place and spreads progressively. Moreover, the speed of radial expansion of the portion of tube, that is to say the speed of travel of the expansion front along the portion of tube, can be controlled efficiently.

Moreover, the initial portion of tube remains perfectly centred on the axis of the mould, because it is held up to the instant that it expands. The process is hence particularly suitable for the production of tubes of great length.

In the process according to the invention, the sleeve and the mould have the function of respectively exerting, on the portion of tube and on the expanded tube, a counter-pressure which counterbalances the pressure of the fluid blown into the portion of tube; in the zone of the portion of tube which is located immediately downstream of the sleeve and which is undergoing expansion, the counter-pressure can be exerted by any appropriate means, such as, for example, an auxiliary fluid which is kept under pressure in an annular chamber delimited by the sleeve on the one hand and the mould on the other.

In the process according to the invention, the preferred method of exerting the counter-pressure on the zone, of the portion of tube, which is undergoing radial expansion downstream of the sleeve, is to cause this zone to slide over an annular surface located at the outlet of the sleeve and extending in the direction of the internal wall of the mould.

In the process according to the invention, the relative movement of the sleeve along the portion of tube can be achieved by any appropriate means. For example, according to a first embodiment, the portion of tube and the mould can be kept static and the sleeve caused to slide along the portion of tube. According to a second embodiment, the sleeve is kept static and the mould and the portion of tube are moved conjointly so as to withdraw the portion of tube progressively from the sleeve. According to a third embodiment, the sleeve and the mould and kept static and the portion of tube is progressively withdrawn from the sleeve and moved within the mould. According to an additional embodiment, the sleeve and the portion of tube are moved simultaneously and in opposite directions, whilst the mould is kept static.

These two latter embodiments of the process according to the invention make it possible to use a mould consisting of two consecutive sections, of which one, close to the sleeve, is kept at a temperature close to the temperature which allows molecular orientation of the plastic, whilst the other is cooled so as to set and rigidify the expanded tube.

In a preferred embodiment of the process according to the invention, the friction of the sleeve on the portion of tube, and the relative movement of the sleeve along the portion of tube are effected in such a manner as to cause longitudinal stretching of the portion of tube. This particular embodiment of the process according to the invention makes it possible to produce bi-oriented tubes, that is to say tubes in which the plastic of which the tubes consist is oriented both in the peripheral direction and, to a considerable degree, in the longitudinal direction. The degree of longitudinal orientation can be regulated through choice of the working conditions, in particular the roughness of the wall of the sleeve, the nature of the plastic employed, the thickness of the wall of the portion of tube, the temperature of the portion of tube, the speed of relative movement of the sleeve along the portion of tube and the shape of the annular surface fixed on the sleeve. As an alternative, it is also possible to vary the degree of longitudinal orientation by interposing a layer of a material having a high coefficient of friction between the portion of tube and the sleeve.

If, on the other hand, it is desired to avoid longitudinal stretching of the portion of tube, it may prove useful to interpose a lubricant film between the portion of tube and the sleeve.

The thermal conditioning of the portion of tube which is to be oriented can be effected before introducing the portion into the mould. It can, for example, be carried out in an oven or by immersion in a bath thermostatically controlled to the desired temperature. It can also be carried out in situ in the mould before carrying out the expansion and, in that case, can advantageously be effected by a circulation of a heat transfer fluid in direct or indirect contact with the internal face, the external face, or both faces simultaneously, of the wall of the portion of tube.

It has proved especially advantageous if, after inserting the portion of tube into the sleeve, a first heat transfer fluid is circulated inside the portion of tube, in direct contact with its wall, and a second heat transfer fluid is circulated along the external face of the wall of the sleeve. This heat transfer fluid can be steam or a liquid such as water or oil.

The fluid under pressure which is used to bring about the radial expansion can be a gas such as compressed air, steam or a mixture of compressed air and steam, or a liquid such as water or an oil. This fluid can be at any desired tempperature, which is in general between ambient temperature and the temperature of molecular orientation of the plastic constituting the portion of tube. However, it is preferred that the fluid should be at a temperature substantially equal to the temperature of the plastic.

The process according to the invention permits the production of monoaxially or biaxially oriented tubes, in which the degree of peripheral orientation in general varies from 10 to 300% and the degree of longitudinal orientation from 0 to 100%. For special applications the process can nevertheless be modified so as to give higher degrees of orientation.

The process according to the invention can be applied to portions of tubes produced from any plastic, provided the latter is extrudable and has a temperature range over which it can be molecularly oriented by stretching. By way of example of these materials there may be mentioned the vinyl, olefine and acrylic plastics, and the thermoplastic polyesters. It has been found that the process according to the invention is particularly suitable for tubes produced from resins based on vinyl chloride, the ideal orientation temperature in that case ranging approximately from 80° to 130° C. and preferably from 90° to 120° C.

The process according to the invention can be applied to portions of tube of any dimensions but has proved particularly valuable for portions of tube which have a length/diameter ratio greater than 40. It is applicable to tubes of circular profile as well as to tubes having a different profile, for example tubes or hollow profiles having an oval, or polygonal convex or concave, cross-section.

The invention also relates to an apparatus for carrying out the process described above, which comprises a tubular mould whose transverse dimensions correspond to those of the tube to be produced and which is equipped with a device for admitting a fluid under pressure into a zone of the mould intended to receive the portion of tube which is to be expanded radially, a device for closing and gripping one end of the portion of tube in the mould, a tubular sleeve which opens into the mould by an open end opposite the closing and gripping device and which has transverse dimensions corresponding to those of the portion of tube which it is intended to receive, and a means for causing a controlled relative axial movement of the sleeve in relation to the closing and gripping device, in order to move them apart and withdraw the portion of tube from the sleeve, in which the open end of the sleeve is equipped with an annular piston which is mounted slidingly in the mould.

In the apparatus according to the invention, the mould and the sleeve can be made from any material which can, without deformation, withstand the pressure of the fluid blown into the portion of tube under the conditions of use of the process according to the invention. They can usually consist of metal tubes, for example made of steel.

If it is desired to cause longitudinal stretching of the portion of tube during its radial expansion so as to generate a molecular orientation in the longitudinal direction in the tube, it can be useful to employ a sleeve having a rough wall.

Means of admitting fluid under pressure can, for example, consist of an injector connected to a reservoir containing the fluid (a gas or a liquid) in a pressurised condition.

The closing and gripping device serves the twin purpose of closing the portion of tube whilst the fluid under pressure is introduced into it, and of holding the portion of tube in position during the relative movement of the sleeve along the portion of tube. It can, for example, consist of jaws intended to grip the end of the portion of tube or of a plug which is screwed or glued onto the end of the portion of tube.

The annular piston can have various shapes and can in particular be a disc at right angles to the axis of the sleeve.

However, according to a preferred embodiment of the invention, the annular piston has a surface located at the outlet of the sleeve and extending towards the internal wall of the mould, of substantially truncated-cone shape and widening in the direction of the closing and gripping device. Preferably, the angle of the cone is between 15° and 75°. The surface can be curved.

The means for causing the relative axial movement of the sleeve in relation to the closing and gripping device are not critical and, as explained earlier, can be designed so as, for example, to cause the sleeve to move relative to the closing and gripping device, which is held fixed, or vice versa. By way of example, these means can consist of a pair of rollers acting on the sleeve so as to distance it from the closing and gripping device, a pair of rollers acting on the mould or on the expanded and cooled tube at the outlet of the mould, so as to distance it from the sleeve, a mechanical, hydraulic or pneumatic jack interposed between the sleeve and the closing and gripping device, or an electric or fluidic motor acting on the sleeve or on the closing and gripping device.

During use of the apparatus according to the invention in order to carry out the process according to the invention, it is advantageous also to close the free end of the portion of tube. The means employed for this purpose are not critical. For example, the free end of the portion of tube can be pinched in jaws, or can be welded.

According to an advantageous embodiment of the apparatus according to the invention, the sleeve is closed at one end, so that it forms a closure of the free end of the portion of tube; the means for causing the controlled relative axial movement of the sleeve in relation to the closing and gripping device comprises, on the one hand, the device for admission of fluid, which is fixed to the closing and gripping device and, on the other hand, a device for starting the movement. This device can advantageously be a fluidic starter comprising a second piston fixed to the mould and mounted slidingly on the sleeve, and a calibrated exit-line for a fluid trapped in the annular variable-volume chamber delimited by the sleeve, the mould and the two pistons.

In this embodiment of the invention, the piston fixed to the sleeve is preferably located in the immediate vicinity of the open end of the sleeve and extends up to the internal wall of the mould. According to another embodiment, the sleeve can be equipped with a starting device mounted on its end opposite from the closing or gripping device.

The apparatus according to the invention and its operation will additionally be explained in more detail in the description, given below, of two practical embodiments.

In this description, reference will be made to the figures in the attached drawings, in which.

Figure 1:
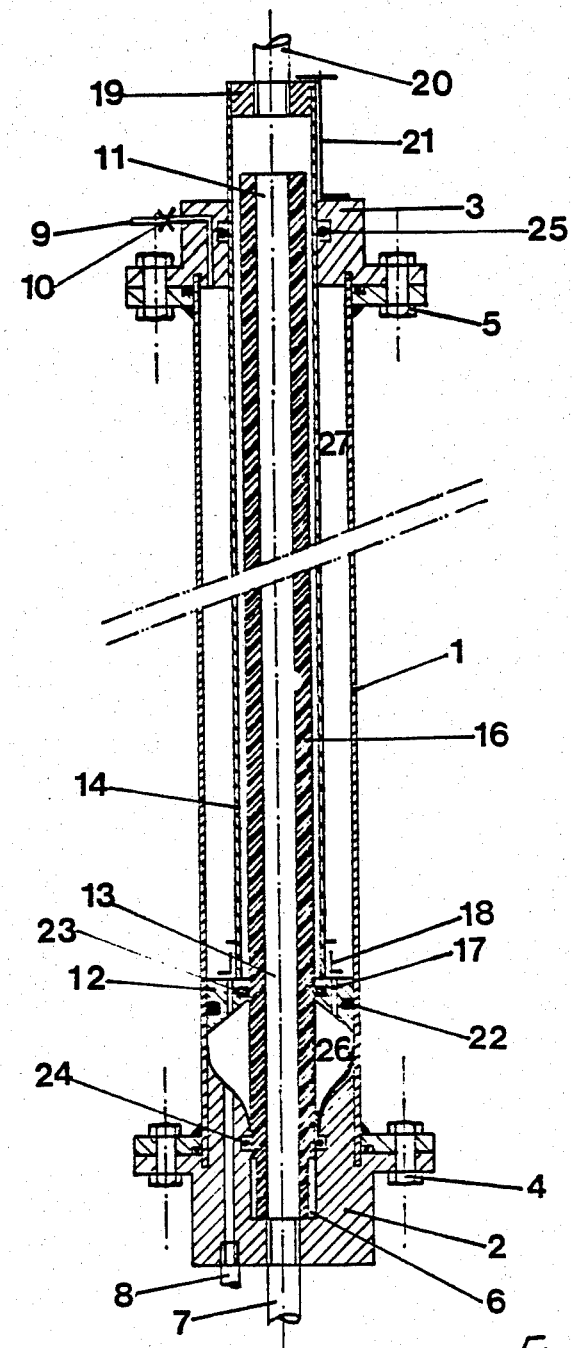
FIG. 1 is a cross-sectional view of a first embodiment of the apparatus according to the invention, in the position it assumes before expansion of the portion of tube.
Figure 2:
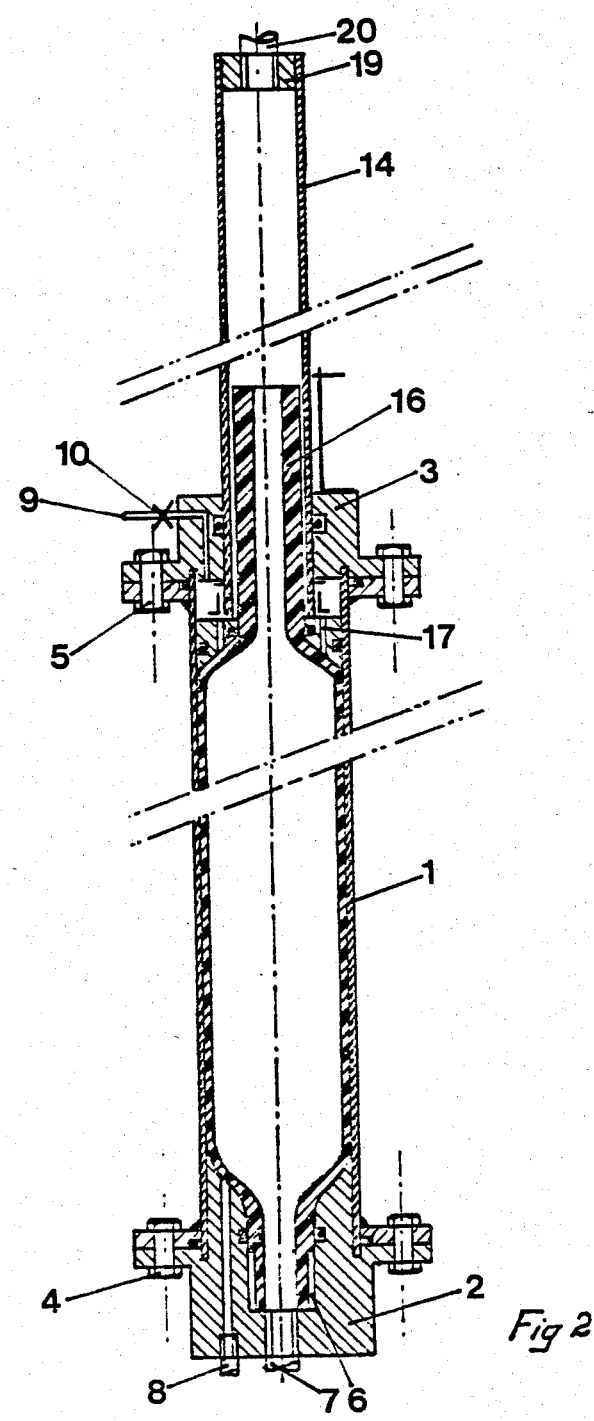
FIG. 2 is a cross-sectional view of the apparatus according to FIG. 1, in the position it assumes at the end of the expansion operation.

As may be seen in FIGS. 1 and 2, the apparatus according to the invention, according to a first practical embodiment, comprises a mould consisting externally of a tubular envelope 1 flanged at its ends, and two covers 2, 3 fixed in a removable manner by bolts 4, 5 to the flanges of the tubular envelope 1.

The internal diameter of the tubular envelope 1 corresponds to the external diameter of the oriented tube which it is desired to produce.

The first cover has a threaded internal central seat 6 for fixing therein a portion of tube 16, an axial nozzle 7 opening into the seat 6 and a lateral nozzle 8 opening outside the seat 6 into the tubular envelope 1.

The second cover 3 is provided with a peripheral nozzle 9 opening into the mould and equipped with an adjustable valve 10, and possesses a central orifice 11.

The apparatus furthermore comprises a tubular sleeve 14 arranged axially in the envelope 1 and fixed at one end to an annular piston 12 which can slide axially in the envelope 1. The circular central orifice 13 of the piston 12 and the internal diameter of the sleeve 14 substantially correspond to the external diameter of the portion of tube 16 which is to be molecularly oriented by radial expansion. The piston 12 is additionally pierced by longitudinal nozzles 17 which, on the rear face of the piston, are equipped with non-return valves 18.

The sleeve 14 is mounted slidingly in the central orifice 11 provided in the cover 3, which thus constitutes a second piston fixed to the envelope 1 of the mould. The length of the sleeve 14 is such that the sleeve opens through this central orifice 11 when the piston 12 is close to the cover 2. The end of the sleeve 14 opposite from the piston 12 is equipped with a closing plug 19 provided with a nozzle 20 equipped with a valve which is not shown, so as to form a closure for the portion of tube 16.

O-rings 22 and 25 provide a seal between the pistons 3 and 12, the envelope 1 and the sleeve 14, so as to define an annular chamber 27 of variable volume. O-rings 23 and 24 are also provided to fix the portion of tube 16 in a leakproof manner to the cover 2, and allow its leakproof passage through the internal orifice 13 of the piston 12. The cover or piston 3 is moreover equipped with a bolt 21 which makes it possible to block the sleeve 14 when the piston 12 is close to the cover 2.

To use the apparatus of FIGS. 1 and 2 in order to produce an oriented tube, an appropriate method is to detach the cover 2 from the tubular envelope 1 and to fix the end of one portion of plastic tube 16 into the threaded seat 6, for example by screwing. Thereafter, the portion of tube is introduced, by its other end, into the apparatus so that the said portion extends through the piston 12 and is seated in the sleeve 14. The cover 2 is then re-fixed onto the envelope 1 and the piston 12 is brought into the position illustrated in FIG. 1 and blocked in position by means of the bolt 21 acting on the end of the sleeve 14. The portion of tube 16 thus enclosed in the apparatus is thereafter brought to the orientation temperature of the plastic by circulation of a fluid, such as oil, at an appropriate temperature. This fluid is introduced through the nozzles 7 and 8, circulates inside the portion of tube 16 and in the annular chamber 27, especially via the nozzles 17, and leaves via the nozzles 9 and 20. When the portion of tube 16 has reached its orientation temperature, the circulation of the heat transfer fluid is stopped, the valve 10 of the nozzle 9 is closed, and the nozzle 8 is connected to the atmosphere so as to purge the fluid from the chamber 26. It should be noted that on the other hand the fluid remains trapped in the space 27 because the valves 18 prevent the fluid from flowing out through the nozzles 17.

In order to start the expansion of the portion of tube 16, the bolt 21 must now be unblocked and the pressure of the fluid introduced into the portion of tube 16 via the nozzle 7 must be increased, the discharge valve 20 being closed. As a result, that art of the portion of tube which is in the chamber 26 located downstream of the sleeve 14 and the piston 12 dilates radially and comes to rest against the external contour of this chamber 26, whilst the remaining part of the portion of tube 16 is held back laterally by the sleeve 14 and does not deform. Moreover, during this initial radial expansion of the portion of tube, the piston 12 cannot move because it is blocked by the fluid trapped in the chamber 27. In order to bring about, and control, the progression of the expansion along the portion of tube 16, it suffices next to open the valve 10 in a predetermined manner so as progressively to remove the fluid trapped in the chamber 27. The piston 12 and the sleeve 14 can accordingly move gradually, at a predetermined speed, towards the cover 3 under the action of the fluid injected via the nozzle 7, thus permitting progressive expansion of the whole of the portion of tube 16 to the diameter of the tubular envelope 1.

The movement of the piston 12 and of the sleeve 14 is started by the controlled escape of the fluid contained in the chamber 27, via the nozzle 9 and the valve 10, thus making it possible to set the speed of movement to the desired value, for example between about 0.1 and 10 m/min. When the piston 12 reaches the cover 3, as shown in FIG. 2, the process of expansion of the portion of tube 16 is ended and the injection of fluid under pressure is stopped. The expansion fluid can then be gradually replaced by a cold fluid under pressure, so as to cool the expanded portion of tube 16 whilst maintaining its shape.

As explained above, it is possible, by suitable choice of the conditions of operation and of the materials of which the sleeve 14 and the piston 12 are made, to cause longitudinal stretching of the portion of tube 16 by the sleeve 14 and the piston 12, whilst these are pushed back by the expansion fluid introduced at 7. In that case, a bioriented tube is obtained, whose length, as illustrated in FIG. 2, is greater than that of the initial portion of tube. Release from the mould of the oriented, expanded tube obtained at the end of the process can easily be achieved by separating the cover 2 from the tubular envelope 1 and injecting a fluid under pressure through the nozzle 10. As a result, the piston 12 is pushed back in the direction of the cover 2 and expels the tube from the tubular envelope 1. After release from the mould, the cover 2 is separated from the tube and a new cycle can start.

Figure 3:
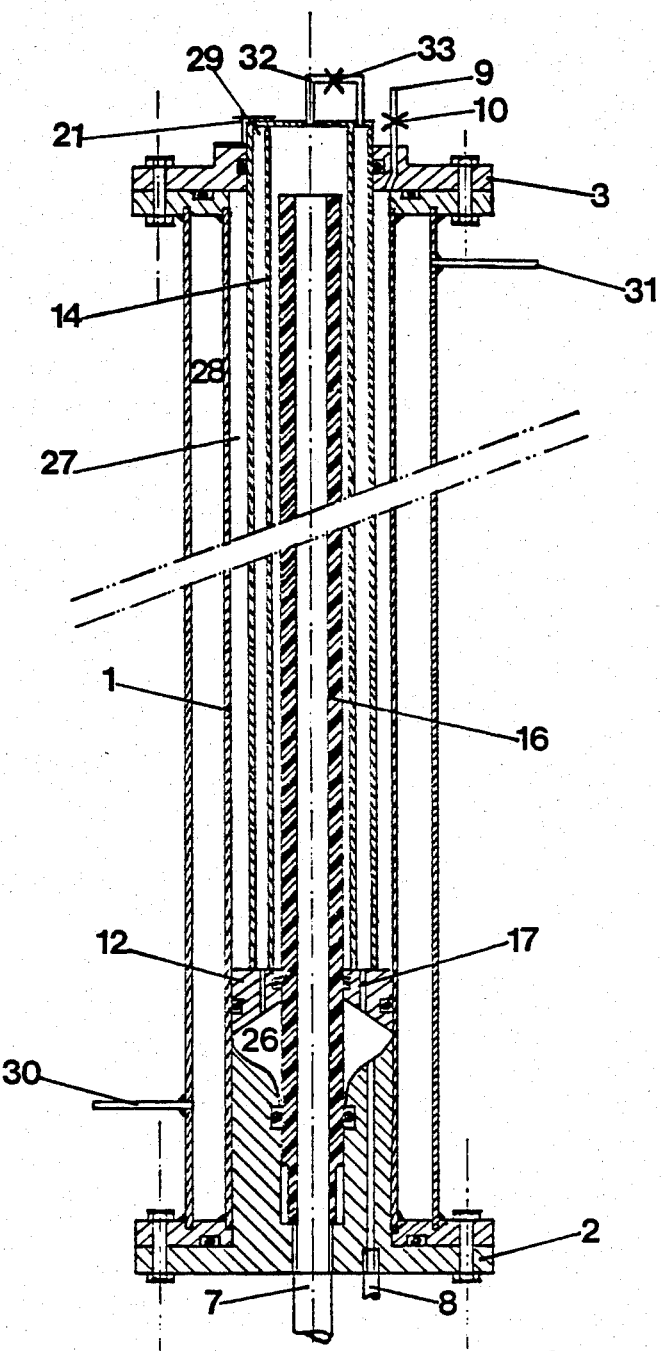
FIG. 3 is a cross-sectional view of a second embodiment of the apparatus according to the invention, in the position it assumes before expansion.

Another embodiment of the apparatus according to the invention is illustrated in FIG. 3.

In this embodiment, the tubular envelope 1 and the sleeve 14 are equipped with a jacket 28 and 29 respectively. The jacket 28 of the envelope 1 possesses two nozzles 30 and 31 for introducing and discharging a cooling fluid. Moreover, the end of the sleeve 14 is connected directly to the jacket 29 via a nozzle 32 equipped with a valve 33. Finally, the piston 12 is equipped with longitudinal nozzles 17 which do not have a non-return valve and these nozzles open directly into the jacket 29. The remainder of this apparatus is similar to that illustrated in FIGS. 1 and 2 and hence it is not necessary to give a more detailed description thereof.

Equally, the positioning of the portion of tube 16, to be oriented, in the apparatus and the fixing of the end of this portion of tube in the seat provided in the cover 2, remain similar to what has been stated with regard to the apparatus described with reference to FIGS. 1 and 2.

In the same way as explained earlier, before starting the operation of the apparatus in FIG. 3 the bolt 21 blocks the sleeve 14 and the space 27 between the tubular envelope 1 and the jacket of the sleeve 14 contains an incompressible fluid such as oil injected via the nozzle 9 before the adjustable valve 10 is closed.

Thereafter, the portion of tube 16 is thermally conditioned to its molecular orientation temperature by injecting a fluid at a suitable temperature via the nozzle 7. This fluid circulates in the apparatus via the interior of the portion of tube 16, the nozzle 32, the open valve 33, the jacket 29 and the nozzle 17, and is discharged through the nozzle 8. It is thus clear that the portion of tube 16 is thereby treated on both its faces. After thermal conditioning, the expansion of the portion of tube is started by closing the valve 33 and increasing the pressure of the fluid introduced through the nozzle 7, or by replacing the thermal conditioning fluid by another fluid under pressure, such as a liquid or a gas. As a result, the piece of the portion of tube 16 which is trapped in the space 26 between the cover 2 and the piston 12 is deformed by the internal pressure of the expansion fluid and presses against the internal contour of this chamber. It is clear, furthermore, that the wall of the portion of tube 16 thus brought into contact with the envelope 1 is cooled directly by means of the jacket 28.

In order subsequently to control the progressive expansion of the entire portion of tube 16, it suffices to unblock the bolt 21 and to cause the gradual discharge of the fluid trapped in the chamber 27 via the nozzle 9, whilst regulating the opening of the valve 10.

As a result, the piston moves progressively towards the cover 3 whilst controlling the progressive expansion of the portion of tube 16. In this apparatus, again, the portion of tube 16 remains centred and held on the axis of the mould, until it has been expanded completely, by means of the sleeve 14 and the central orifice provided in the piston 12.

As expansion takes place, so the external wall of the portion of tube undergoing radial expansion comes into contact with the tubular envelope 1 and is cooled by means of the jacket 28.

When the portion of tube is completely expanded, the piston 12 is in the vicinity of the cover 3. At that instant, the injection of fluid under pressure via the nozzle 7 is stopped and is replaced, if desired, by a cold fluid under pressure, so as to complete, if necessary, the cooling of the oriented tube to a temperature which allows the tube to be removed from the mould.

The tube can be removed from the mould in a similar manner to that described for the apparatus of FIGS. 1 and 2, and in particular by re-injecting imcompressible fluid into the space 27 via the nozzle 9.

It should moreover be noted that the apparatus of FIG. 3 also permits the portion of tube 16 to be stretched longitudinally, if desired, during the progressive expansion, and accordingly permits the production of a bioriented tube.

I claim:

1. A process for the production of a tube of a molecularly oriented plastic, wherein a section of a tube, heated to the temperature at which stretching induces a molecular orientation of the plastic, is placed in a mold and a portion of the section of the tube is clamped in a sleeve and the sleeve is caused to undergo a relative movement along the section of the tube while a fluid under pressure is introduced into the tube so as to cause radial expansion to an internal wall of the mold of portions of the tube at the outlet of the sleeve progressively along the section and the resulting oriented tube is finally cooled and removed from the mold, characterized in that the portions of the tube undergoing radial expansion slide over an annular surface which is located at the outlet of the sleeve and extends up to the internal wall of the mold, said annular surface providing a counterbalancing support to the fluid under pressure, thereby enabling the molecular orientation of the plastic tube to be controlled.

2. Process according to claim 1, characterized in that a fluid whose temperature is substantially equal to the molecular orientation temperature of the plastic is employed for the radial expansion of the portions of tube.

3. Process according to claim 1, characterized in that the friction of the sleeve on the portion of the section of the tube and its relative movement along the section of the tube are controlled so as to cause longitudinal stretching of the section of the tube.

4. Process according to claim 1, characterized in that a section of tube made of a resin based on vinyl chloride is used and is heated to a temperature of between 90° and 130° C. before its radial expansion.

* * * * *